April 29, 1941.  A. H. JOHNSON  2,239,966
DISPENSING DEVICE
Filed July 31, 1939  2 Sheets-Sheet 1
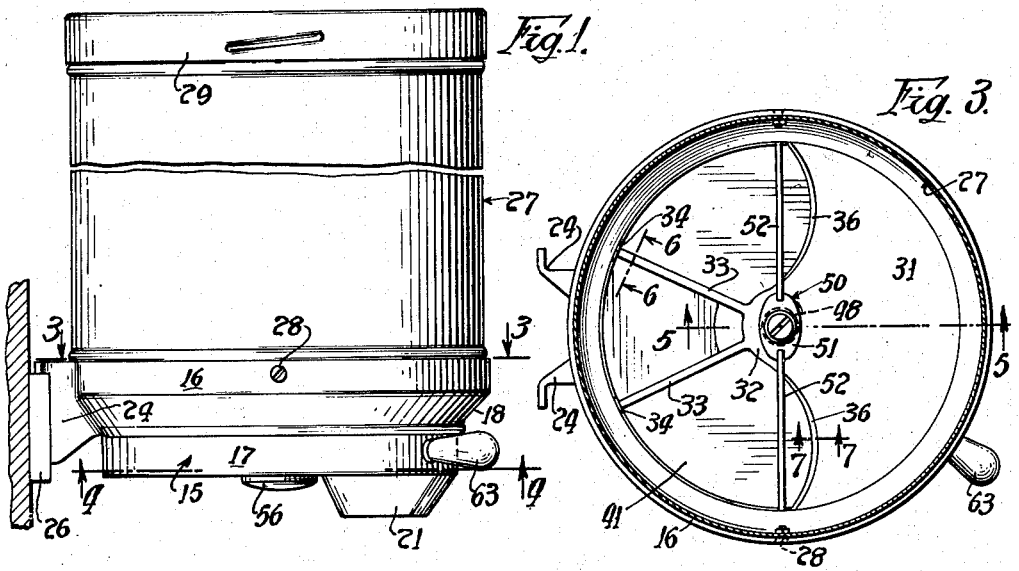
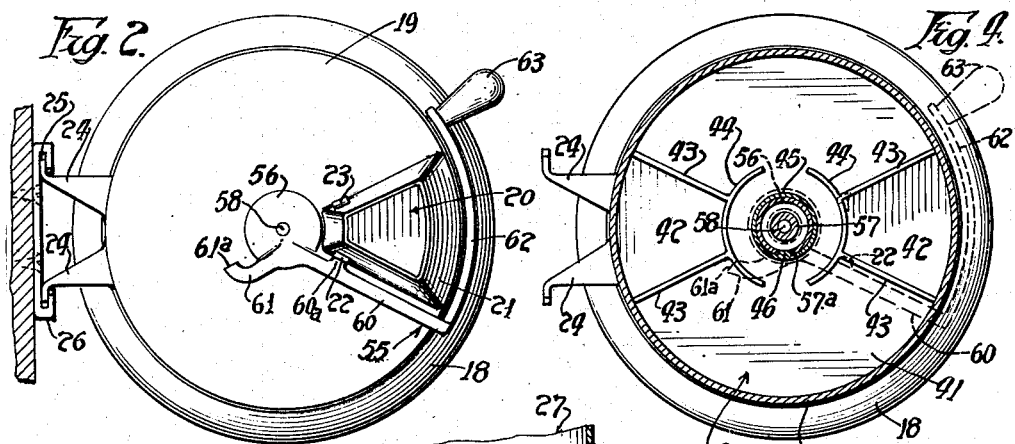
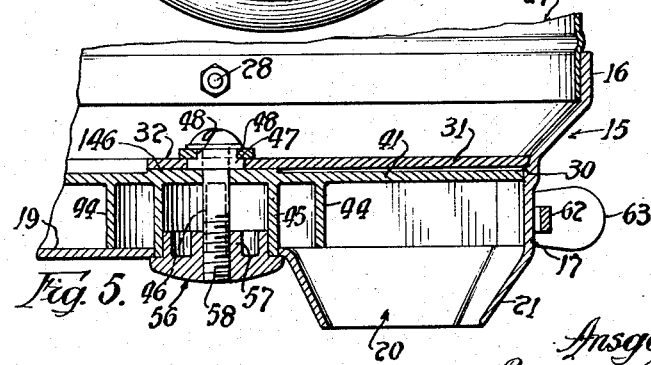
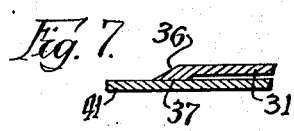
Inventor:
Ansgarius Hesekiel Johnson,
By Arthur M Nelson
Attorney.

April 29, 1941. A. H. JOHNSON 2,239,966
DISPENSING DEVICE
Filed July 31, 1939 2 Sheets-Sheet 2
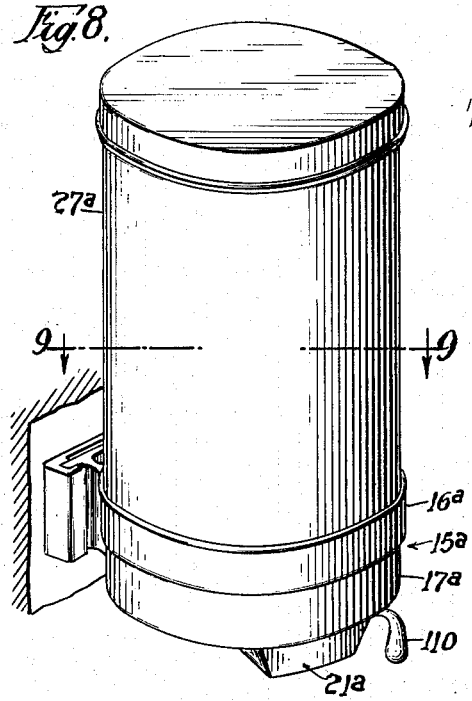
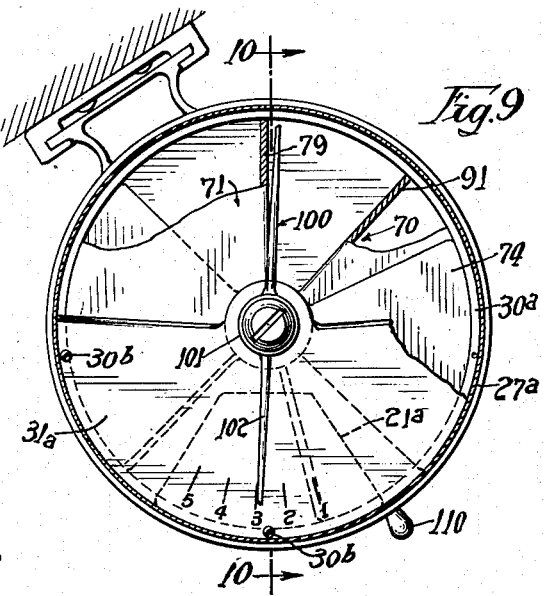
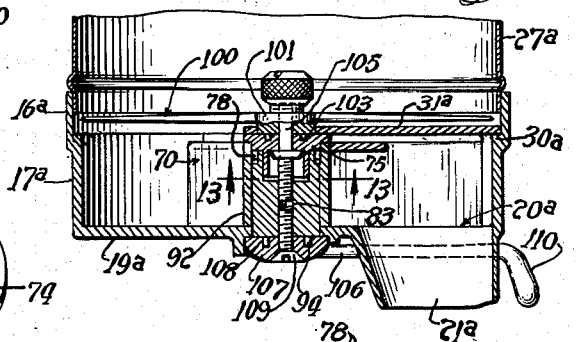
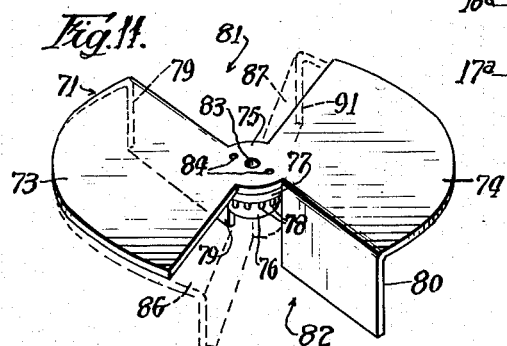
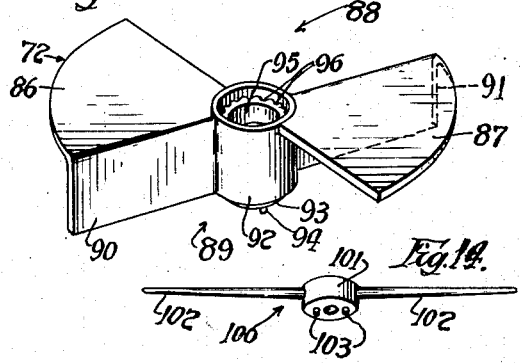
Inventor:
Ansgarius Nesekid Johnson,
By: Arthur M Nelson
Attorney.

Patented Apr. 29, 1941

2,239,966

UNITED STATES PATENT OFFICE 2,239,966

DISPENSING DEVICE

Ansgarius H. Johnson, Chicago, Ill., assignor to Club Aluminum Products Company, Chicago, Ill., a corporation of Delaware Application July 31, 1939, Serial No. 287,439

8 Claims. (Cl. 221—108)

This invention relates to improvements in dispensing devices and it consists of the matters hereinafter described and more particularly pointed out in the appended claims.

The devices with which the present invention is especially concerned are those for dispensing measured quantities of granular material, such for example, as ground coffee, from a container.

One of the objects of the present invention is to provide a device of this kind which is simple in construction for low cost production and which is easy to operate in accurately dispensing measured amounts of material.

Another object of the invention is to provide a device of this kind which is not only devoid of springs but of other parts which are apt to break and render the device inoperative.

Again, it is an object of the invention to provide a device which is relatively air-tight, and therefore protects the material content against deterioration and loss of flavor.

Also it is an object of the invention to provide a device of this kind that may be easily adjusted to dispense different measured amounts of the material.

Also it is an object of the invention to provide a device of this kind wherein the top of the rotor of the dispenser is cleaned each time the same is operated so that packing of the material thereon is avoided.

The above mentioned objects of the invention, as well as others, together with the several advantages thereof will more fully appear as the specification proceeds.

In the drawings:

Fig. 1 is a view in side elevation of a dispensing device embodying one form of the invention.

Fig. 2 is a view in elevation of the bottom of the device appearing in Fig. 1.

Fig. 3 is a horizontal sectional view through the device appearing in Fig. 1 as taken on the line 3—3 of said Fig. 1.

Fig. 4 is another horizontal sectional view through the device appearing in Fig. 1 as taken on the line 4—4 of said Fig. 1.

Fig. 5 is a vertical detail sectional view through a part of the device, on an enlarged scale, as taken on the line 5—5 of Fig. 3.

Fig. 6 is another vertical detail sectional view through a part of the device, on an enlarged scale, as taken on the line 6—6 of Fig. 3.

Fig. 7 is a vertical detail sectional view on an enlarged scale through a part of the structure shown in Fig. 3 as taken on the line 7—7 of said Fig. 3.

Fig. 8 is a perspective view of a dispensing device embodying a modified form of the invention.

Fig. 9 is a horizontal sectional view through the device appearing in Fig. 8 as taken on the line 9—9 thereof.

Fig. 10 is a vertical sectional view through the bottom end portion of the device shown in Fig. 8 as taken on the line 10—10 of Fig. 9.

Figs. 11 and 12 are perspective views of certain parts of the device appearing in Fig. 8 and which parts are so formed as to provide an adjustment in the size of the dispensing pockets.

Fig. 13 is a horizontal sectional view, on an enlarged scale, through a part of the device appearing in Fig. 10 as taken on the line 13—13 of Fig. 10.

Fig. 14 is a perspective view of a certain agitator employed in the structure shown in Figs. 8, 9 and 10 respectively and which will be more fully referred to later.

Referring now in detail to that embodiment of the invention illustrated in Figs. 1 to 7 inclusive of the accompanying drawings, 15 indicates the base of the dispenser as a whole. Said base includes upper and lower annular walls 16 and 17 of different diameters connected by an inwardly and downwardly tapering wall 18, and a flat bottom wall 19. A discharge opening 20 is formed in the front portion of the bottom wall and associated therewith is a depending discharge spout 21. The side walls of said spout are shown as substantially radial ones and projections or shoulders 22 and 23 respectively are formed on the inner ends of said walls as appears in Fig. 2 and the purpose of which will later appear. 24 indicates laterally spaced tapering flanges at the rear of the base and which flanges are adapted for removable engagement in companion grooves 25 in a wall plate 26 and whereby the device as a whole may be conveniently supported.

27 indicates a material container in the form of a canister or the like having an open bottom end that fits in the annular wall 16 of the base. Screws 28 may be employed to secure said end of the container to said wall. The open top end of said container is closed by a removable cover 29.

The junction of the wall parts 15 and 17 of the casing is formed to provide a stepped annular shoulder 30, the front half of which is disposed at an elevation lower than that of the rear half. A semicircular partition plate 31 has peripheral marginal engagement up the lower front half of said shoulder. Said plate includes a central hub portion 32 from which radiates a pair of diverging spoke-like arms 33 that terminate in enlargements 34 to engage in receiving recesses 35 formed in the higher front half of the shoulder 30.

With this arrangement, when the partition plate is in place, the top surface thereof is flush with the top surface of the higher rear half of the shoulder 30. The rear edges 36 of the plate-like partition are curved forwardly and are beveled as shown and coincident with said edges, the underside of said partition is formed as flat bearing margins 37 arranged below the bottom face of said partition. The bottom surfaces of the spoke-like arms 33 are disposed in the plane of said margins 37. The plate-like partition coacts with the bottom wall 19 in forming a chamber, the front portion of which is in communication with the opening 20 and associated spout and the rear portion of which is in open communication with the upper portion of the base and the container 27 thereon.

In the chamber above-mentioned, is located a dispensing member or valve 40 including a top plate 41 and oppositely disposed recesses 42 therein and each of a shape and size to correspond with shape and size of the discharge opening 20. The sides of said recesses and the inner end of said recesses are defined by downwardly extending radial flanges 43—43 and a downwardly extending arcuate flange 44 respectively as appears in Fig. 4. Depending from the bottom surface of the top plate and spaced inwardly from the flanges 44 is a full annular flange 45 having an internal spline 46, the purpose of which will later appear. The flange 45 is longer than the flanges 43 and 44.

On the central portion of the upper surface of the plate 41 is a boss 146, that is of a height approximating the margins 37 of the plate 31 so as to engage flush against the underside of the hub portion 32 of said plate. Rising from said boss is a second boss 47, the bottom portion of which is journalled in an opening in the hub portion of the plate 31, the upper portion of the second boss being formed with flat sides 48.

When the dispensing member or valve is disposed in said chamber before mentioned, the bottom end of the flange 45 bears in a hole in the bottom wall 19 and the bottom edges of the flanges 43 and 44 ride upon the top surface of the wall 19. Under such conditions the recesses 42 coact with the bottom wall of the base to form measuring pockets. An agitator or arch breaker 50 is arranged just above the partition so as to turn with the member 40. This agitator has a hub 51 and oppositely disposed arms 52 and in the hub is an opening with flat sides to fit upon the upper end portion of the second boss 47. With the arrangement described, the agitator 50 which turns with the dispenser member or valve, stands at a right angle to a plane passing centrally through both pockets. At the end of each operation of the device as a whole, the agitator stands substantially parallel with the curved rear edges of the partition 31.

55 indicates the operating lever of the dispensing device, as a whole, and which includes a hub 56 that has a portion 57 disposed in the bottom end of the flange 45. The portion 57 has a recess 57a to receive the spline 46 and whereby the dispensing member or valve 40 is operatively secured to the operating lever. A screw 58 extends down through the boss 47 and the central portion of the wall 41 and is threaded into the hub 56 of the operating lever to hold the parts together in operative relation. The lever 55 includes a pair of oppositely disposed arms 60 and 61 respectively, the arm 60 being bent upwardly toward the front end and is there formed as an arcuate extension 62 arranged in the central plane of the wall 19. This extension terminates in a finger grip knob 63. The arms 60 and 61 each carries a boss 60a—61a for engagement with the shoulders 22 and 23 before mentioned and this limits the turning movement of the lever and the dispensing member or valve 40 to 180°. When the lever 55 has been so turned in one direction as to be stopped by the engagement of its boss 60a with the boss 22 on the spout, one recess 42 registers with the discharge opening 20 and the other recess is disposed in position between the spokes 33 of the partition plate so as to receive a supply of material from the container.

When the lever is turned in the opposite direction, the pockets become reversed in position so that the other recess registers with the opening 20 for a discharge of its contents while the first one moves into position between the spoke 33 of the partition plate so as to receive a content charge as before. As the dispensing member or valve moves in one direction or the other, the filled pocket moves under the edge 36 of the partition plate and the contents are struck off even with the top surface of the plate 41 of the dispensing member or valve so that no part of the contents can work into the space between said partition plate and the top plate of the dispensing member. As the edge portions 36 of the partition 31 are curved and beveled as before described and as the sides of the pockets in the dispensing member or valve are straight and radial, an easier action is afforded for the turning of the said dispensing member or valve. The reason therefor is because as the trailing side of a pocket approaches one of said edges 36, a shearing action is produced on the material at said trailing side of the pocket. Therefore, any large particles that may be disposed between said edges are cut apart and cannot pack in-between said edges as a block that would impose considerable resistance to the turning movement of the dispensing member or valve.

In the movement of the dispensing member back and forth through its movement of 180° as limited by the stops 22—23, the agitator 50 moves therewith so that for each movement of the dispensing member, one arm 52 of the dispensing member sweeps over the entire area of the top surface of the partition 31 and the other one sweeps over the arms 33 of said partition 31. Likewise, in each movement of the dispensing member or valve, the top surface of one side of the dispenser between both pockets is swept clean by one arm 33 and the other arm functions as a strike-off for the pocket just filled. Thus the exposed top surfaces of the partition 31 and the dispensing member between the pockets therein are cleaned off so that the material being dispensed cannot arch above the partition 31 and cannot pack upon the top surface of the dispensing member between said pockets.

In Figs. 8 to 14 inclusive is illustrated a modified form of construction whereby it is possible to change the size or volume of the measuring pockets. In this instance 15a indicates the base as a whole, and which includes upright annular wall portions 16a and 17a respectively of different diameters and the junction of which forms an annular shoulder 30a. The base has a bottom wall 19a, in the front portion of which is a discharge opening 20a and a spout 21a as before. A container 27a is supported by the wall portion 16a. A semicircular partition plate 31a is engaged upon and is detachably secured to the shoulder 30a by screws 30b (see Fig. 9) to coact with the bottom 19a in providing a chamber in which is located a dispensing valve or member 70. In this instance, the said valve or member is made of upper and lower coacting parts 71 and 72 respectively and which appear individually in perspective in Figs. 11 and 12 respectively.

The upper part 71 comprises oppositely disposed segmental plate portions 73 and 74 respectively, joined by a hub 75 which includes a bottom end depending flange 76 and an annular shoulder 77 from which depends a plurality of pilot pins 78. Along opposed radial edges of the plate portions 73 and 74 are depending flanges 79 and 80 respectively, the pairs of radial edges of both plate portions coacting to provide recesses 81 and 82 as shown. The hub 75 has a center hole 83 and a pair of spaced recesses 84 in its top portion.

The lower part 72 comprises oppositely disposed segmental plate portions 86 and 87 of lesser arcuate extent than the plate portions 73 and 74 of the upper part 71 and this leaves opposed recesses 88 and 89 respectively of greater arcuate extent than the like recesses in the upper part 71. The plate portions 81 and 82 each include opposed depending flanges 90 and 91 respectively and are joined at their inner ends to a hub 92, that has a bottom end extension 93, that fits in a suitable hole in the bottom wall 19a of the casing. Depending from this extension is a plurality of pilot pins 94, the purpose of which will later appear. In the upper end of the hub 91 is formed a recess 95 to receive the flange 76 on the upper part 71 and the upper end of said recess is enlarged to receive the shoulder 78 of said upper part 71. At the junction of said recesses is provided an annular row of notches 96, one for each pilot pin 78 on the upper part 71. When the parts 71 and 72 are arranged in operative relation, the recesses 81—82 of the upper part and their associated flanges 79 and 80 in connection with the recesses 66—67 of the lower part and their associated flanges 88 and 89 coact to define material receiving pockets. To change the size or volume of said pockets, the parts are separated axially and then reassembled at different angular position, said parts then being non-rotatively connected together by the engagement of the pins 78 in the notches 96.

100 indicates the agitator which in this instance includes a hub 101 and radial arms 102. The hub fits in a hole in that part of the plate 31a located centrally of the base and is provided with pilot pins 103 to fit in the recesses 84 in the hub 75 of the upper part 71. The hub 75 of the upper part 71 and the hub of the agitator are connected together by a screw 105, the screw having a swivel connection with said hubs so as to be rotative with respect thereto but holding said hubs against axial separation. The bottom end of this screw has a threaded engagement in the hub 92 of the lower part 72 of the dispensing valve.

106 indicates an operating lever by which the dispensing valve is rotated or swung first in one direction and then back in the other direction. Said lever includes a hub 107 with recesses 108 in the upper faces thereof to receive the pilot pins 94 on the hub of the lower member 72 of the dispensing member. A screw 109 secures the hubs 75 and 92 together. The lever 106 is provided at its outer end with a handle 110 whereby the same may be grasped for actuation. To change the volume of the pockets formed by said upper and lower parts, the screws 30b are removed so that the plate 31a may be lifted up the desired distance above the shoulder 30a. The screw 105 is then turned in a manner withdrawing it from the hub a distance sufficient to remove the pins 78 from the recesses 95 so that the two parts 71 and 72 may be relatively turned to positions that either increase or decrease the size of the pockets in the dispensing member. To indicate the size or volume of the pocket, the plate 31a may be provided with indicia as appears in Fig. 9 and with which one of the arms 102 of the agitator will coact. After the parts have been replaced in the new relative position, the screws 30b are replaced and the device is again ready for operation.

While in describing the invention, I have referred in detail to the form, arrangement and construction of the parts involved, the same is to be considered only in the illustrative sense so that I do not wish to be limited thereto except as specifically set forth in the appended claims.

I claim as my invention:

1. A dispensing device comprising a base adapted to support a container and having a bottom provided with a discharge opening, a partition plate overlying a portion of said bottom and disposed above that part of said bottom of the base having said discharge opening, dispensing means disposed between said bottom and partition and journaled for swinging movement about an axis transverse to said bottom and partition, said dispensing means having a pocket therein adapted to be moved from an exposed position to a position beneath said partition, said partition having a concave curved edge extending toward the axis of said dispensing means, said edge first engaging the contents of the pocket at the ends of the edge when the dispensing member is moved toward the partition plate and subsequently engaging the contents intermediate the edges thereof to sever the contents of the pocket from the bulk with a minimum disturbance thereof, said edge being depressed below the underside of the partition.

2. A dispensing device comprising a base adapted to support a container and having a bottom provided with a discharge opening near one edge thereof, dispensing means within said base including a hub, means coacting with said hub for journaling said dispensing means for swinging movement, said dispensing means further including a top plate having oppositely disposed recesses therein, radial flanges disposed at the sides of the recesses and defining chambers therebetween adjacent said recesses, arcuate flanges disposed at the inner ends of said recesses encircling said hub and forming in conjunction with said hub an annular chamber, said arcuate flanges falling short of one another to bring said annular chamber into communication with said first named chambers, a partition disposed above said dispensing member and overlying that part of the bottom of said base having said discharge opening, and means for swinging said dispensing means.

3. A dispensing device comprising a base adapted to support a container and having a bottom provided with a discharge opening, a substantially semi-circular partition plate above that part of said bottom of the base having said discharge opening, dispensing means disposed between said bottom and partition plate and journaled for movement about the axis of said partition plate, said dispensing means having two pockets therein each adapted to be moved from an exposed position to a position beneath said partition plate, the diametral edges of said partition plate being sharpened and in the form of a concave arcuate curve, said edges being both disposed substantially on one side of a plane passing through the axis of said partition plate and equally spaced from said edges, both of said sharpened edges approaching said plane toward the ends of said edges, each of said edges progressively engaging the contents of a pocket when the pocket is moved beneath the partition plate to sever the contents of the pocket from the bulk with a minimum disturbance thereof.

4. A dispensing device comprising a base adapted to support a container and having a bottom, said bottom having a discharge spout at the forward portion of the same, dispensing means within the base adapted to swing about an axis transverse of said bottom, said dispensing means having two pockets therein disposed on opposite sides of the axis thereof and adapted to be alternately brought into register with said discharge spout upon swinging of said dispensing means throughout an angle of substantially 180°, an operating lever extending along the bottom of said base and having a part connected to said dispensing means, said lever including a radial arm extending outwardly from the part connected to said dispensing means, and an angularly disposed arm connected therewith, a finger grip on the end of said angularly disposed arm, said finger grip being movable past said discharge spout, said arms forming a bight therebetween receiving said discharge spout when the dispensing means is moved into a position to bring one of said pockets into register with said discharge spout and the finger grip to its forward position whereby the lever clears the discharge spout when the finger grip is in such position.

5. A dispensing device comprising a base adapted to support a container and having a circular bottom provided with a discharge spout adjacent the periphery thereof and an annular wall extending upwardly from said bottom, dispensing means within the base adapted to swing about an axis transverse of said bottom and disposed at the center thereof and in opposite directions, a lever extending along the bottom of the base and having a part connected to the lowermost part of said dispensing means, one of said parts having a portion extending through said bottom, said lever having a radial arm extending outwardly to the periphery of said base, and an arcuate arm offset upwardly from said radial arm and following along the periphery of the annular wall, a finger grip at the end of said arcuate arm movable past said discharge spout, said finger grip being movable past said discharge spout, said arms forming a bight therebetween receiving said discharge spout when the dispensing means has been moved to its extreme position in which said finger grip is in its forward position whereby the lever clears said discharge spout.

6. A dispensing device comprising a base adapted to support a container and having a bottom provided with a discharge opening, a partition overlying a portion of said bottom and disposed above that part of said bottom of the base having said discharge opening, dispensing means disposed between said bottom and partition and journaled for swinging movement about an axis transverse to said bottom and partition, said dispensing means having a pocket therein adapted to be moved from an exposed position to a position beneath said partition and formed with a trailing side, said partition having a concave curved edge extending in a direction such that the ends of said concave edge are closer to the trailing side of the pocket than the intermediate portion thereof when the pocket is in proximity to said arcuate edge, the contents of the pocket being first engaged by the ends of the arcuate edge when the dispensing member is moved toward dispensing position and subsequently being engaged by the portion of the arcuate edge intermediate the ends thereof to sever the contents of the pocket from the bulk with a minimum disturbance thereof.

7. A dispensing device comprising a base adapted to support a container and having a bottom provided with a discharge opening, a partition overlying a portion of said bottom and disposed above that part of said bottom of the base having said discharge opening, dispensing means disposed between said bottom and partition and journaled for swinging movement about an axis transverse to said bottom and partition, a separate operating lever disposed beneath said bottom and having a part disposed adjacent the lowermost part of said dispensing means, one of said parts having a portion extending through said bottom and journalled in said bottom, means on said parts for restraining relative rotation between said parts and engageable through axial movement of said lever toward said bottom, a separate agitator disposed above said partition, said agitator having a part disposed adjacent the upper part of said dispensing means, one of said second named parts having a portion extending through said partition and journalled in said partition, means on said second named parts for restraining relative rotation between said second named parts and engageable through axial movement of said agitator toward said partition, and means passing through said agitator, dispensing means and lever for simultaneously urging said agitator toward said partition and said lever toward said bottom.

8. A dispensing device comprising a base adapted to support a container and having a bottom provided with a discharge opening disposed near one edge of the base, a spout at said discharge opening having spaced lateral walls disposed beneath said bottom, dispensing means within the base adapted to swing alternately in opposite directions about an axis transverse of said bottom, an operating lever extending along the bottom of said case and having a part fixedly connected to the lowermost part of said dispensing means, said lever having two arms, a finger grip on one of said arms for moving said lever and a stop on each of said arms for engagement with the lateral walls of said spout to limit the movement of said dispensing means in opposite directions.

ANSGARIUS H. JOHNSON.